US010645020B1

(12) United States Patent
Subramanyam et al.

(10) Patent No.: US 10,645,020 B1
(45) Date of Patent: May 5, 2020

(54) VIRTUAL NETWORKING FOR COMPUTE INSTANCES

(71) Applicant: Amazon Technologies, Inc., Seattle, WA (US)

(72) Inventors: Naveen Dasa Subramanyam, Seattle, WA (US); Shashanka Krishnaswamy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 140 days.

(21) Appl. No.: 15/420,053

(22) Filed: Jan. 30, 2017

(51) Int. Cl.
*H04L 12/24* (2006.01)
*H04L 12/911* (2013.01)
*H04L 29/12* (2006.01)

(52) U.S. Cl.
CPC ............. *H04L 47/70* (2013.01); *H04L 41/20* (2013.01); *H04L 61/1511* (2013.01); *H04L 61/2015* (2013.01)

(58) Field of Classification Search
CPC .... G06F 9/5027; G06F 3/0604; G06F 9/4856; G06F 3/067; G06F 3/0647; G06F 3/0644; G06F 17/3028; G06F 9/455; G06F 9/5077; G06F 9/45558; G06F 11/0712; G06F 11/0793; G06F 11/1484; G06F 11/1471; G06F 9/544; G06F 9/545; G06F 9/5044; G06F 9/4881; G06F 9/50; H04L 67/142; H04L 67/34; H04L 47/803; H04L 61/2015; H04L 67/32; G06K 9/6218; H04W 8/26
See application file for complete search history.

(56) References Cited

U.S. PATENT DOCUMENTS

| | | | | |
|---|---|---|---|---|
| 8,621,069 B1* | 12/2013 | Tompkins | ............ | G06F 9/5027 709/224 |
| 9,690,622 B1* | 6/2017 | Argenti | ................ | G06F 9/5027 |
| 10,013,265 B2* | 7/2018 | Kairali | ................ | G06K 9/6218 |
| 2004/0040025 A1* | 2/2004 | Lehtinen | ............... | G06F 9/4881 718/104 |
| 2004/0054997 A1* | 3/2004 | Katragadda | ........... | G06F 9/5044 718/102 |
| 2006/0233128 A1* | 10/2006 | Sood | ................... | H04L 61/2015 370/328 |
| 2010/0318999 A1* | 12/2010 | Zhao | ..................... | G06F 9/5044 718/104 |
| 2011/0161988 A1* | 6/2011 | Kashyap | ................ | G06F 9/544 719/319 |
| 2013/0297964 A1* | 11/2013 | Hegdal | ............... | G06F 11/0712 714/2 |

(Continued)

*Primary Examiner* — Aftab N. Khan
(74) *Attorney, Agent, or Firm* — Davis Wright Tremaine LLP

(57) ABSTRACT

A computing resource service provider may provide customers with access to software functions executing within compute instances. In addition, customer may desire that the software functions executing within the compute instances have access to virtual network operated by the customer. To accomplish this, a network interface belonging to the customer may be created and attached to a particular compute instance. In addition, this network interface may be moved from global network namespace of the compute instance into a new network namespace within the compute instance. In this manner, software functions executed by the compute instance may communicate to other computing device attached to the virtual network through the network interface.

20 Claims, 7 Drawing Sheets

(56) References Cited

U.S. PATENT DOCUMENTS

| | | | | |
|---|---|---|---|---|
| 2016/0380916 A1* | 12/2016 | Gnaneswaran | ....... | H04L 47/803 |
| | | | | 709/224 |
| 2017/0372173 A1* | 12/2017 | Kairali | ................. | G06K 9/6218 |
| 2018/0074748 A1* | 3/2018 | Makin | ................... | G06F 3/0604 |

* cited by examiner

VIRTUAL NETWORKING FOR COMPUTE INSTANCES

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate the utilization of data center resources, virtualization technologies may allow a single physical computing machine to host one or more compute instances that appear and operate as independent computer machines to a connected computer user. With virtualization, the single physical computing device can create, maintain, or delete virtualized computing resources in a dynamic manner.

In a large distributed computing system (e.g., multiple distributed data centers) of a computing resource service provider, various customers, users, services, and resources of the computing resource service provider are in frequent communication with each other. Furthermore, certain computing devices and/or computing resources may be located in different networks which may be protected private networks. In such distributed computing systems, it can be difficult to facilitate communication between computing devices and/or computing resources located on different networks. The complexity and distribution of computing resources in these environments may make it difficult to create and operate network connections between computing resources on different networks.

BRIEF DESCRIPTION OF THE DRAWINGS

Various techniques will be described with reference to the drawings, in which.

DETAILED DESCRIPTION

Figure 1:
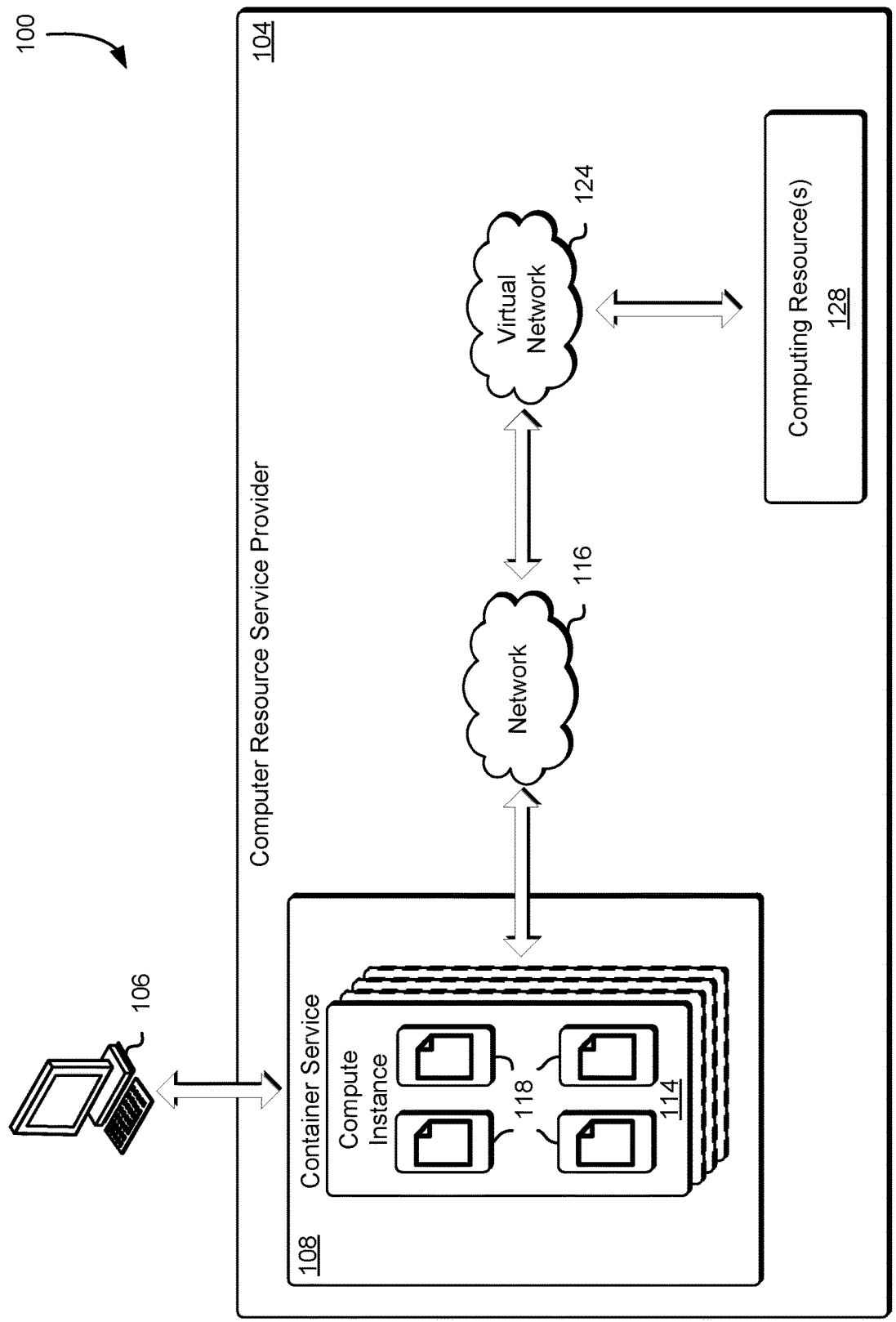
FIG. 1 illustrates an environment in which compute instances may communicate with a plurality of different networks in accordance with at least one embodiment.

In various examples described below, network interfaces are attached to compute instances executing software functions on behalf of customers of a computing resource service provider. The network interfaces enable the software functions to communicate with computing resources operated by the customer and connected to a virtual network described in greater detail below. Specifically, a customer may operate a virtual network, such as a virtual private network or other network, using computing resources provided by the computing resources service provider. The customer's virtual network may be connected to one or more other networks through a gateway, such as an internet gateway or other networking device. The customer's private network may also include firewalls and other security devices that protect computing resources by preventing computing devices on a public network or other network (e.g., any network that is not the customer's virtual network) from communicating with the computing resources connected to the customer's virtual network.

Because of the protection afforded by these virtual networks, it can be difficult to enable compute instances and the software functions executed by the compute instances to communicate with computing resources connected to virtual networks. In addition, the computing resource service provider may leverage these computing resources by providing a plurality of customers access to computing resources including the compute instances described in the present disclosure. The multi-tenancy provided by the computing resource service provider adds to the difficulty and complexity of establishing a communications channel between the compute instances and other computing resources connected to a virtual network. To enable this kind of communication, a particular network namespace is created within a compute instance. A network interface may be attached to the network namespace such that the network interface is accessible to the compute instance through a virtual network interface. A virtual network interface (which may include a virtual network interface pair) is then used to enable the software functions executed within the compute instance to communicate with the virtual network through the network interface.

For example, when a customer requests execution of a software function that requires communication with one or more computing resources connected to a virtual network, a container service, described in greater detail below, may automatically provision a compute instance with a network interface capable of communicating with the virtual network (e.g., has a network address including a subnet mask matching the virtual network). The container service may first obtain a compute instance from a pool or other logical grouping of compute instances and create a network interface associated with a particular subnet and/or security setting. The container service may then connect or otherwise attach the network interface to the compute instance and provide the compute instance with information identifying the network interface. For example, the container service may transmit the media access control address (MAC address) of the network interface to the compute instance.

Once the compute instance detects the network interface, the compute instance may create a network namespace and move the network interface to the network namespace. In various embodiments, the compute instance is responsible for configuring the Domain Name System (DNS) and other networking settings of the network interface, which may be configured within the network namespace. In addition, the compute instance may place one interface of a "pair" of interfaces of a virtual network interface in a software function network namespace of the compute instance and the other interface of the "pair" in the network namespace. In addition, the network interface may be contained within the network namespace and a global namespace. The global namespace may be a namespace accessible to all of the software functions executed by the compute instance regardless of namespace the software function is executed within. Furthermore, the virtual network interface can establish a pipe between the network namespace and the software function network namespace, enabling the virtual network interface to transmit communications from the software function to various networks including the customer's virtual network.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an aspect of an environment 100 in which an embodiment may be practiced. As illustrated in FIG. 1, the environment 100 may include a container service 108 of a computing resource service provider 104 implementing a plurality of compute instances 114 executing one or more software functions 118 communicating with computing resources 128 connected to a virtual network 124. A scheduler, such as the scheduler service or other entity, may determine into which compute instance 114 the software functions 118 specified in a task definition file should be launched. A container manager, describer in greater detail below in connection with FIG. 2, may provision a network interface to enable the software functions 118 executed within the compute instance 114 to communicate with the virtual network. In some embodiments, the software functions 118 may be configured to access computing resources 128 provided by other services of the computing resource service provider 104, such as a storage volume, non-relational database, relational database, storage device, computing instance, or other computing resource connected to the virtual network 124.

The computing resources 128 connected to the virtual network 124 may be any suitable computer system, server computer system, virtual machine, mobile device, smartphone, tablet, portable computer, or other device capable of communicating over a virtual network 124 or other network. The container service 108 may attach a network interface and a virtual network interface, described in greater detail below, to the compute instance 114 using various namespaces. The network interface may then be provided with an Internet Protocol (IP) address and/or or subnet associated with the virtual network 124. Furthermore, a network address translation (NAT) gateway or other gateway may be used to route traffic to the IP address and from the IP address to other devices on the virtual network 124. Furthermore, the NAT gateway may direct network traffic directed towards a computing resource connected to the virtual network over a network 116 operated by the computing resource service provider 104. For example, the computing resource service provider 104 may operate the network 116 to enable communication with the container service 108 and other services of the computing resource service provider 104. In various embodiments, the container service 108 or other services may store the tasks and/or software function 118 to be executed by the compute instance 114 on behalf of customers 106. In such embodiments, the customer 106 may transmit a request to the computing resource service provider 104 to execute one or more tasks and/or software functions 118 indicated in the request.

As described in greater detail below, the customer 106 may provide credentials or other information to the container service 108 to enable the container service 108 or access other services of the computing resource service provider 104 to create, provision, and manage various computing resources on behalf of the customer 106. For example, the customer 106 provides the container service 108 with credentials to allow the container service 108 to generate a network interface using a virtual networking service. Once the network interface has been created, the container service may then attach the network interface to a compute instance 114. Through the network interface the software functions 118, when caused to be executed by the customer 106 (e.g., by customer request), may cause the underlying computer system executing the compute instance 118 to communicate through the network 116, which may be a communication network, such as the Internet, an intranet, an Internet service provider (ISP) network, and/or some other such network as described below, to computing resources 128 connected to the virtual network 124. Furthermore, as described in greater detail below, various namespaces may be created to contain the network interface and enable the network interface to be shared by software functions 118.

In various embodiments, a "task definition" or "task definition file" may refer to a file specifying operations that may be performed by a particular software function. The task definition file may further specify computing resources 128 at network locations located on the virtual network 124 that the software functions 118 are required to communicate with to execute the tasks. Furthermore, the task definition file may then be utilized for launching one or more software functions 118. In some implementations, the task definition file may define and link software functions 118 spread across multiple physical machines. One task definition file may contain and schedule many tasks, including tasks that require communication with computing resources 128 connected to the virtual network 124. In some examples, a "task" may refer to an instantiation of a task definition file and may consist of one or more software functions 118.

The task definition file may contain all the information needed to place software functions 118 in containers 114, and containers 114 may be managed through application programming interface calls.

An example of a task definition may be:
{ 'db':
{
  'Image': 'forest/postgresql',
  'location': 10.168.7.92
  'subnet': 225.255.5.5
  'Ports': ['5432'],
  'CPU': 1000,
  'Memory': 1073741824
},
'web':
{
  'Image': 'hub.web.com/rails:latest',
  'Ports': ['8000:8000'],
  'location': 10.168.7.68
  'subnet': 255.255.5.0
  'links': ['db'],
  'CPU': 1000,
  'Memory': 1073741824
}
}

The example task definition specifies that a first task, entitled "db," has a software image located at the path "forest/postgresql." The first task is allocated processing capacity of 1,000 and 1 gigabyte of memory, the first task uses port 5432 and communicates with computing resources at the location 10.168.7.92 in the subnet 225.255.5.5. In this example, the location is on a subnet within the virtual network 124. As described in greater detail below, the virtual network may be operated by the customer 106 using computing resources 128 of the computing resource service provider 104 or other entity. In addition, the location within the virtual network may point to a single computing resource 128 or a plurality of computing resources 128. For example, the location included in the task detention could point to a load balancer or other computing device responsible for directing requests to one or a plurality of computing devices.

Similarly, the task definition also specifies that a second task, entitled "web," has a software image located at the path "hub.web.com/rails:latest." The second task is allocated processing capacity of 1,000 and 1 gigabyte of memory, and the second task uses ports 8000:8000. The task definition notes that the second task ("web") is allowed to link to the first task ("db"), which may enable the second task to communicate with the first task. Furthermore, the task definition also indicates that the second task communicates with a computing resource at location 10.168.7.68 in the subnet 255.255.5.0. The computing resource may be connected to the virtual network 124 or the network 116.

The container service 108, described in greater detail below in connection with FIG. 2, may be a service provided by the computing resource service provider 104 to allow the customer 106 to execute the software functions 118 within the compute instances 114. The computing resource service provider 104, described in greater detail below, may provide one or more services to the customers 106 individually or as a combination of services of a distributed computer system. The one or more services of the computing resource service provider 104 may be accessible over the network 116 and may include services such as virtual computer system services, block-level data storage services, cryptography services, on-demand data storage services, notification services, authentication services, policy management services, task services, database services, and/or other such services. Not all embodiments described include all of the services described, and additional services may be provided in addition to, or as an alternative to, services explicitly described.

The customer 106 of the computing resource service provider 104 may communicate with one or more of the services, including the container service 108, via an interface, which may be a web services interface or any other type of customer interface. Each service provided by the computing resource service provider 104 may have its own interface and subsets of the services may have corresponding individual interfaces in addition to, or as an alternative to, a common interface.

In some examples, a "compute instance" may refer to a computer system instance (virtual or non-virtual, such as a physical computer system running an operating system) that is configured to launch and execute software functions 118. Thus, the compute instance 114 may be configured to execute the software functions 118 within the compute instance 114 in accordance with the task definition file provided by the customer 106 or other entity.

A software function 118 may be a lightweight virtualization instance running under a computer system instance that allows processes and data used by the processes within the software function 118 to be isolated from other processes running in the same computer system instance or compute instance 114. Thus, the software functions 118 may each be virtualization instances running under an operating system of the compute instance 114 and executing in isolation from each other. Each of the software functions 118 may have their own namespace, and applications running within the software functions 118 are isolated by only having access to resources available within the container namespace. Thus, software functions 118 may be an effective way to run one or more single applications within their own namespace.

A container encapsulation system allows one or more software functions 118 to run within a single operating instance without overhead associated with starting and maintaining virtual machines for running separate user space instances. An example container encapsulation system is the Docker® container engine. For example, an application may consist of several software functions 118, and these software functions 118 may be configured to perform operations on behalf of the customer 106. The software functions 118 are executed in a compute instance 114, as described above, using physical computing resources of the computing resource service provider 104. The customer 106 may develop applications and software functions 118 based at least in part on computing resources 128 available to compute instances 114 over the virtual network and not be limited to computing resources available over the network 116.

The software functions 118 may be launched to have only specified resources from resources allocated to the compute instance 114; that is, a software function 118 may be launched to have a certain amount of memory and to not utilize more than a specified amount of processing power. The resource allocation for the software functions 118 may be specified in the task definition file. Multiple software functions 118 may be running simultaneously on a single host computer or host compute instance, and the resources of the host can be allocated efficiently between the software functions 118 and/or compute instances 114. In some embodiments, a host may support running software functions 118 in compute instances 114 from only one customer 106. In other embodiments, a single host may allow multiple customers 106 to have compute instances 114 running on the host. In the latter case, the container service 108 may provide security to ensure that a customer's software functions are unable to access compute instances 114, software functions 118, or virtual network 124 of the others. For example, by providing a distinct namespace of each network interface, as described below, the container service 108 ensures isolation and enables software functions 118 to share IP addresses or IP address ranges.

Different types of tasks may have different resource requirements, different communication requirements (e.g., public networks, private networks, or virtual networks), and may have different lifespans. Thus, the software functions 118 may be dynamically scheduled to run by a scheduler service within the container service 108 independent of an underlying operating system of the compute instance 114 and, as such, the underlying operating system of the compute instance 114 may be very basic. Alternatively, the software functions 118 may be scheduled to run by a scheduler installed within the compute instance 114.

Figure 2:
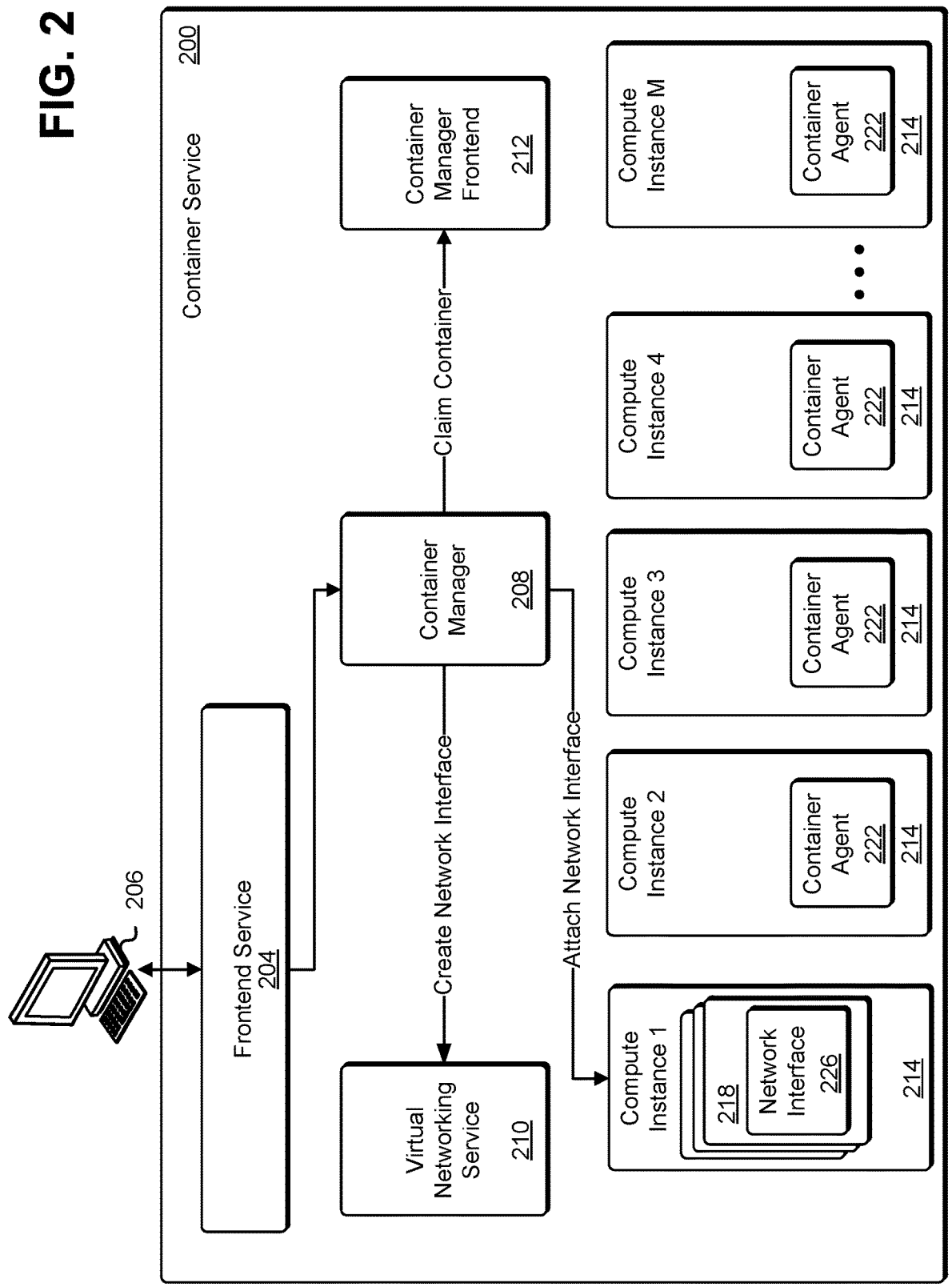
FIG. 2 illustrates an environment in which a container service may provision compute instances with a network interface in accordance with at least one embodiment.

FIG. 2 illustrates an example container service 200 of an embodiment of the present disclosure. As illustrated in FIG. 2, the environment may include a customer 206 of a computing resource service provider communicating through a frontend service 204 to manage one or more compute instances 214 provided by the container service 200. As noted above, a container encapsulation system provided by or interfaced to the container service 200 may allow the customer 206 to configure one or more applications within a software function 218 of an operating system that supports containerization. The processes and resources within the software function 218 may be isolated from other processes of the parent compute instance 214 and from the running processes and resources within other software functions 218 of the same host system. The customer 206 may specify the amount of memory and processing capacity allocated to the software function 218 as well as computing resources connected to a private network that are to be made accessible to the software function 218.

The base compute instance and the applications and data within it may then be packaged as an image. In some examples, an "image" may refer to an entire copy of a particular state of the base compute instance at the time the image was generated. The image thereafter may be used to launch one or more identical software functions 218, each of which may be assigned the specified amount of resources and may be isolated from each other. The software functions 218 may be launched on the same or different physical machines, and each software function 218 may be expected to run in exactly the same way as the base compute instance.

Each of the compute instances 214 may be configured to contain a container agent 222 that may allow software functions 218 and a network interface 226 within the compute instance 214 to be managed, provisioned, configured, and modified. The container service 200 may be comprised of a set of services, including a virtual networking service 210, a container manager service 208, and a container manager frontend 212. Because the container service 200 may be configured as a multi-tenant service (i.e., the resources of the container service 200 may serve multiple customers concurrently), and because the services provided by the container service 200 exist outside and separate from the compute instances 214, the customer 206 need not install individual software applications within their respective compute instances 214 to provide the functionality afforded by the services. The customer 206 may utilize the functionality provided by these services by making web service application programming interface function calls through the frontend service 204, which may be configured to receive requests from the customer 206 and forward the requests to the appropriate service.

Note that in all cases a placement scheme may take the available resources in the compute instances 214 and the resource requirements of the software function 218 into account. For example, a compute instance 214 may not be selected for particular tasks if the particular tasks have resource requirements exceeding the available resources in the compute instance 214. In some implementations, however, the compute instance 214 may still be selected, but launching of the particular tasks may be delayed until enough resources become available within the compute instance 214 to support running the particular tasks. For example, if the compute instances 214 cannot support another network interface 226, the software function 218 may be delayed or executed by a different compute instance 214.

Compute instances 214 may also be configured to utilize other resources provided by the computing resource service provider. For example, each compute instance 214 may be configured with a network interface 226 to allow the compute instance 214 to communicate through the virtual network to other compute instances 214 and/or other resources of the computing resource service provider connected to the virtual network. In addition, security credentials may be assigned on a per-compute instance 214 or per-software function 218 basis so that compute instances 214 have their own security credentials to access the other resources provided by the computing resource service provider.

The container service 200 may interact with an authentication system of the computing resource service provider to authenticate application programming interface calls made to the frontend service 204. In some embodiments, separate security settings and security roles may be configured and assigned to different software functions 218 on a single host. The container service 200 may also be configured to launch software functions 218 and compute instances 214 within a virtual private cloud (VPC). In order to launch such software functions 218 and compute instances 214, the container service 200 may obtain credentials from the customer 206 in order to create the network interface 226, access the virtual private cloud (e.g., virtual network), and associate security settings and/or security roles to the software functions 218 and/or compute instances 214.

As described in greater detail below, in response to a request from the customer 206 to execute a particular software function 218 received by the frontend service 204, the frontend service may forward the request to the container manager 208. The container manager 208 may receive requests to execute software functions 218 and may manage and fulfill execution of the requests. In response to a request to execute a software function 218 that requires communication with a virtual network, the container managers may claim a container from the container manager frontend 212 described in greater detail below. Claiming a container may cause a compute instance 214 to be associated with the customer 206 and obtain the software function 218 to be executed. Furthermore, the container manager 208 may cause the virtual networking service 210 to create the network interface 226. The network interface 226 may be created using credentials provided by the customer 206 and may be associated with security settings or other security setting of the customer 206 such that the network interface 226 can transmit and receive communications of the virtual network.

The container manager 208 may also invoke the network interface within the compute instance 214. As described in greater detail below, the container manager 208 may attach the network interface 226 to the compute instance 214. In yet other embodiments, the container manager 208 may simply provide the compute instance 214 with information associated with the network interface 226 such as a MAC address of the network interface 226. As a result of the container manager 208 invoking the networking interface 226, a container agent 222 of the compute instance 214 may modify and/or create various settings of the network interface 226 to enable communication with computing resources connected to the virtual network. For example, the container agent 222, described in greater detail below, may create a new network namespace and place the network interface 226 within the new network namespace. In addition, the network interface 226 may also be placed in the global namespace of the compute instance 214.

In some embodiments, the compute instances 214 may also attach to other services of the computing resource service provider, such as block-level data storage service and/or on-demand data storage services. In some cases, compute instances 214 may be configured to share attached services with other compute instances 214 and/or software functions 218. As an example, a compute instance 214 of the customer 206 may be mapped to the network interface 226 of the virtual networking service 210 of a computing resource service provider, and the software functions 218 within the instance may each be configured to be able to communicate using the virtual network interface 226. In some examples, the network interface 226 may be shared between multiple software functions 218 executed within the compute instances 214 such that the software functions 218 may all be able to use the network interface 226 to communicate with one or more virtual networks.

The container manager frontend 212 may be configured to receive placement requests from the container manager 208 for customer software functions 218, and may ensure that the requested resources are available for the software functions 218. Additionally, the container manager frontend 212 may receive information from individual container agents 222 regularly, such as information related to life-cycle events and heartbeats (e.g., periodic signals sent by a container agent to indicate normal operation).

The container agents 222 may be software applications configured to run in instances owned by the customer 206 and may act as interfaces between their respective software functions 218 and/or compute instances 214 and other services and entities, such as the container manager frontend 212. For example, the container agents 222 may act as intermediaries between the running software functions 218 of their respective compute instances 214 and other entities and services. In this manner, the container agent 222 may be configured to interpret and translate commands between the compute instance 214 and a particular container encapsulation system running with the container service 200. This may allow changes to be made to the particular container encapsulation system without requiring updates to be made to the tasks or task definitions; i.e., only the container agents 222 may need to be updated to reflect the changes to the particular encapsulation system.

Thus, each of the compute instances 214 may have a respective container agent 222 running within it that communicates with a respective container manager frontend 212. The container agent 222 may, itself, be a software function configured to monitor its respective compute instances 214 and/or software functions 218 executed by the compute instances 214 and may provide information to the system usable to launch compute instances, track compute instances 214, monitor software function execution, and other operations to help manage the container service 200. The container agent 222 may also perform functions of creating various namespaces, provisioning network interfaces 226, provisioning virtual network interfaces, configuring various settings of the network interface 226, and starting and stopping software functions 218 within its respective compute instance 214.

The container agents 222 may be configured to monitor the health of the software functions 218 within the respective compute instances 214 (e.g., report heartbeats signaling that the compute instance is operating, report lifespans of containers, and report container statuses and occurrences of container errors), and may further be configured to perform actions based on the occurrence of certain events. For example, if a container agent 222 detects that a container has encountered an error and ceased operation, the container agent 222 may automatically cause a new compute instance to be generated to replace the malfunctioning compute instance.

FIGS. 1 and 2 described above illustrate serverless computing architecture which allows one or more software functions to run within a single operating instance without overhead associated with starting and maintaining virtual machines for running separate user space instances. The one or more software function can be instantiated within the serverless computing architecture described above and execute source code or other executable instructions provided by a customer.

Figure 3:
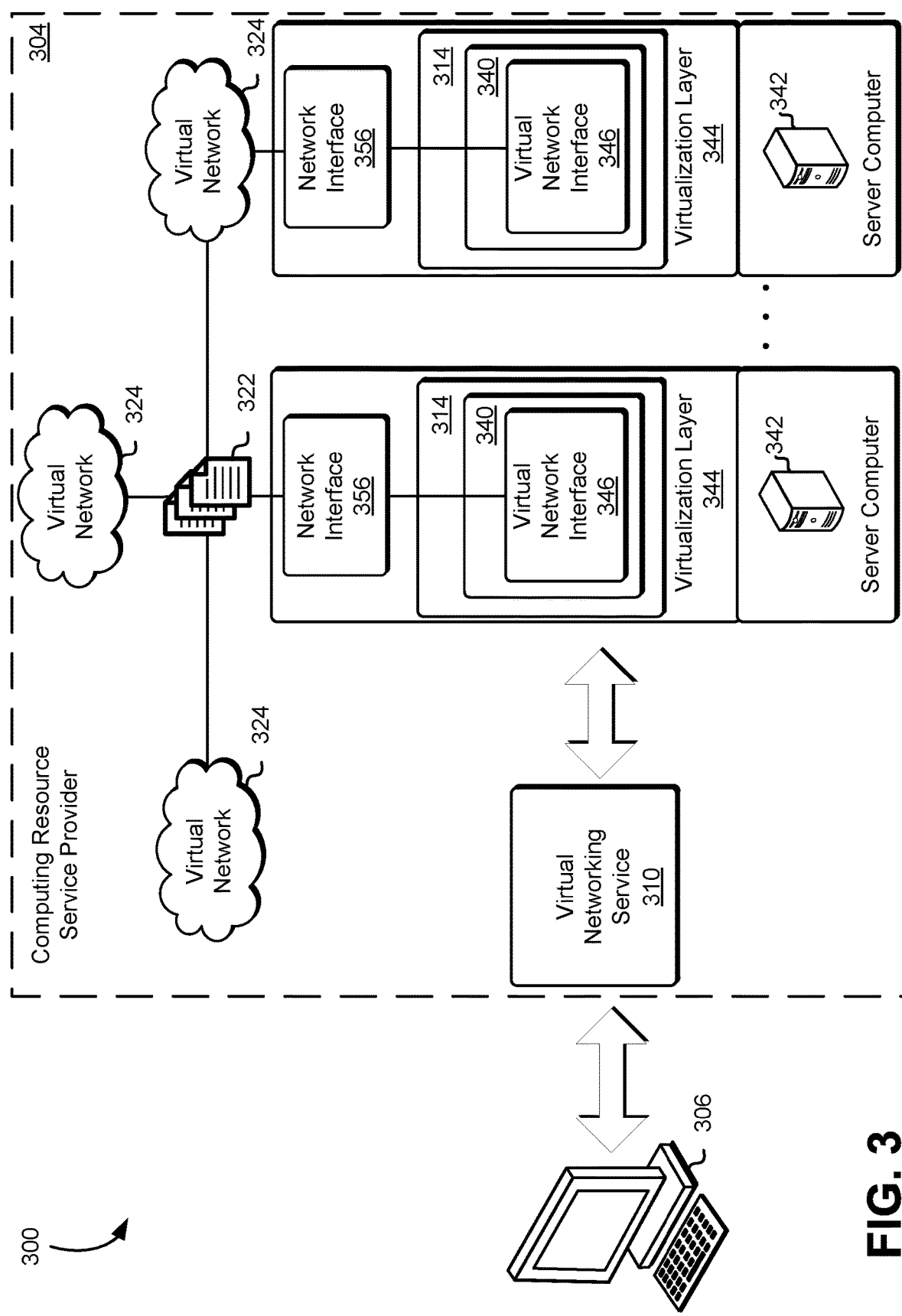
FIG. 3 illustrates an environment in which compute instances may be configured with network interfaces to communicate with virtual networks in accordance with at least one embodiment.

FIG. 3 illustrates an environment 300 in which a virtual networking service 310 of a computing resource service provider 304 may provide software functions executed within compute instances 314 access to one or more virtual networks 324 in accordance with at least one embodiment. The virtual networking service 310, which may be implemented by physical hardware, is used by the computing resource service provider 304 to provide network interfaces 356 that may be attached to compute instances 314 as described above. The virtual networking service 310 may include a group of computing systems, such as the server computers 342 described in detail below, that provide customers 306 with a mechanism to allow software functions executed in compute instances 314 on behalf of the customer 306 to access computing resources connected to one or more virtual networks 324. The one or more virtual networks 324 may be implemented using computing resources of the computing resource service provider 304 or other entities, such as a data center operated by the customer 306. In addition, the one or more virtual networks 324 may be configured by the customer 306 and implemented using computing resources of the computing resource service provider 304 or other entities.

The server computer 342 may be any device or equipment configured to execute instructions for performing data computation, manipulation, or storage tasks, such as a computer or a server. A server computer 342 may be equipped with any needed processing capability including one or more processors, such as a central processing unit (CPU); a graphics processing unit (GPU) or a digital signal processor (DSP); memory, including static and dynamic memory; buses and input and output ports that are compliant with any handshaking; communications; or data transfer protocol. The server computer 342 may also include storage devices, such as storage disks and tapes, networking equipment, and the like.

A virtualization layer 344 may include a bare metal hypervisor or a hosted hypervisor. The virtualization layer 344, executing on the server computers 342, enables the physical hardware to be used to provide computational resources upon which one or more compute instances 314 or other computing resources such as a network interface 356 may operate. For example, the virtualization layer 344 enables a particular compute instance to access physical hardware on the server computer 342 through virtual device drivers or other executable code. In another example, the virtualization layer 344 may enable the compute instance to send and receive packets associated with the network transmission 322 through the network interface 356 or similar device driver. Attaching the network interface 356 may be a logical attachment of virtual resources provided by the virtualization layer 344 that exposes the physical hardware of the server computers 342. The virtualization layer 344 may include a hypervisor or virtualization software and/or hardware.

In addition, the virtualization layer 344 may support a virtual network interface 346. As described above, the virtual network interface 346 provides a pipe to enable software functions with access to a software function network namespace including the virtual network interface 346 to transmit data associated with the network transmission 322 to the one or more virtual networks. The virtualization layer 344 may also include an instance of an operating system dedicated to administering the network interface 356, virtual network interface 346, compute instance 314, or component thereof running on the server computer 342. Each virtualization layer 344 may include its own networking software stack responsible for communication with other virtualization layers 344 and, at least in some embodiments, also responsible for implementing network connectivity between the server computers 342 or components thereof running and other compute instances 314 running on other server computers 342 such as the network interface 356 and virtual network interface 346.

Furthermore, the server computer 342 may host multiple virtualization layers 344 of the same or different types on the same server computer 342 as well as compute instances 314, virtual network interfaces 346, and network interfaces 356 of the same or different types. For example, a server computer system 342 may host a first compute instance that is connected to a first virtual network and may host a second compute instance that is connected to a second virtual network. The virtualization layer 344 may be any device, software, or firmware used for providing a virtual computing platform and/or virtualized computing resources for the compute instance 314 and/or component thereof. The virtual computing platform may include various virtual computer components, such as one or more virtual CPUs, virtual memory, and the like. The compute instance 314 may be provided to the customers 306 or other services of the service provider 304, and the customers 306 may utilize the compute instance 314 to implement applications and operate virtual networks 314. Further, the computing resource service provider 304 may use one or more of its own compute instances 314 for supporting execution of applications and providing computing resources for such applications. For example, the computing resource service provider 304 may use one or more compute instances 314 for supporting execution of the virtual network service 310.

Commands and other information may be included in an application program interface (API) call from the virtual networking service 310 or other component of a container service as described above in connection with FIG. 2 to the virtualization layer 344. For example, the virtual networking service 310 may receive an API request to create the network interface 356 and/or the virtual network interface 346. In various embodiments, the virtual networking service 310 or other component of the container service may provide the compute instance 314 with information associated with the network interface 356 such as a location or address of the network interface 356.

The compute instance 314 or component thereof, such as a container agent as described above, may generate a network namespace 340 and place the network interface in the network namespace 340. The compute instance 314 or component thereof, such as a container agent, may then, for the purpose of executing one or more software functions within the compute instance 314, cause the network namespace to be accessible to the one or more software functions. In various embodiments, a script or other application executing within the virtualization layer 344 or compute instance 314 detects the network interface 356 in the global namespace and moves the network interface 356 to the network namespace 340 and configures various settings of the network interface 356 such as IP address and DNS information. As described in greater detail below, a first interface of a pair of interfaces of the virtual network interface 346 may be placed in the network namespace 340 and a second pair of the virtual network interface 346 in software function network namespace of the container 314. In this manner the virtual network interface 346 provides a means for the network interface 356 to transmit and receive data to computing resources connected to the one or more virtual networks 324. Furthermore, the network namespace 340 and/or the software functions namespace have their own link local IP address or address space. In this manner routing to the software function is simplified, and this allows software functions and computing resources of the virtual network 324 to have the same IP address.

Figure 4:
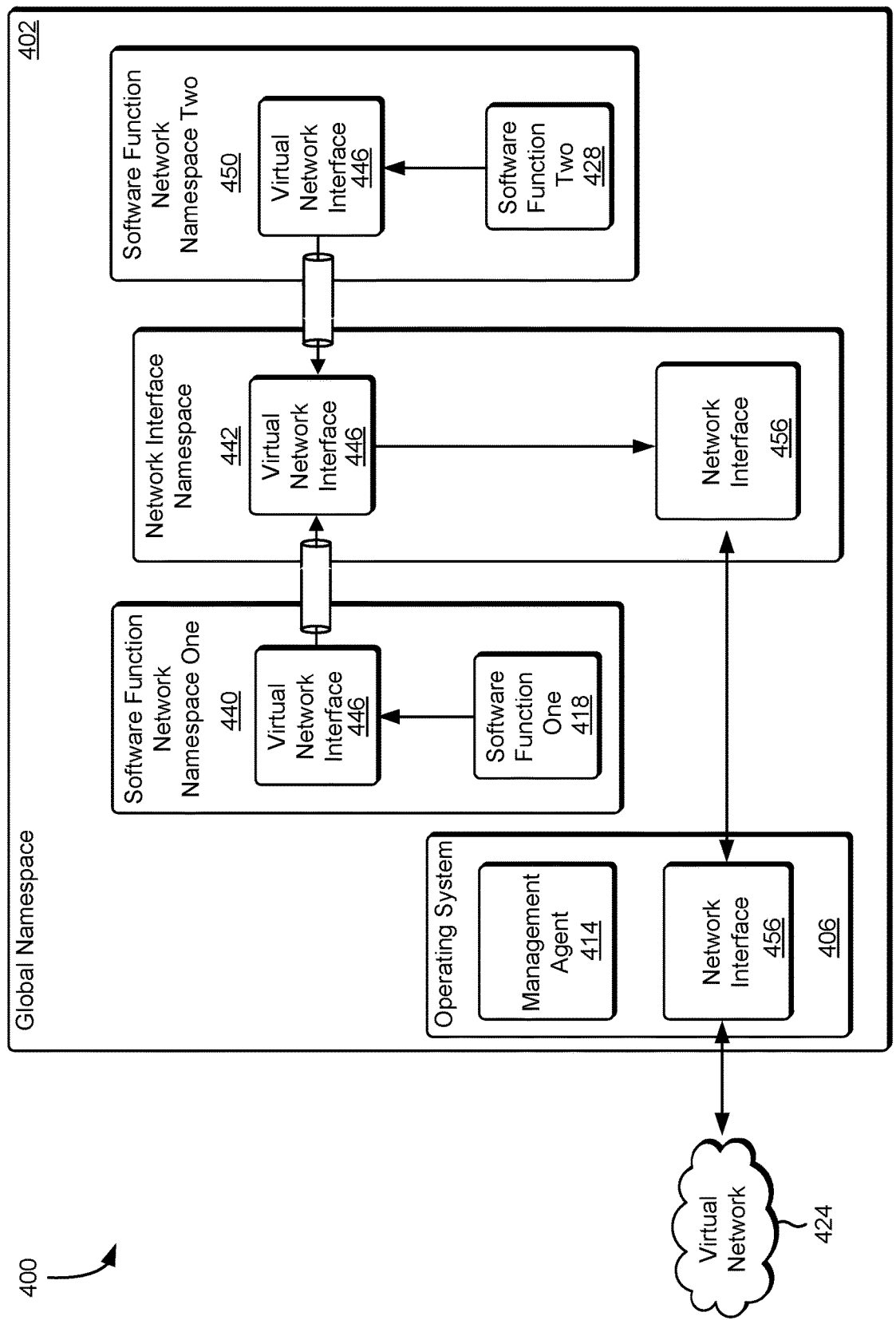
FIG. 4 illustrates an environment in which compute instances may be configured with a virtual network interface pair to communicate with virtual networks in accordance with at least one embodiment.

FIG. 4 illustrates an aspect of an environment 400 in which embodiments may be practiced. As illustrated in FIG. 4, the environment 400 may include a set of software functions, such as software function one 418 and software function two 428, launched within a compute instance being monitored by a management agent 414 and communicating over a virtual network 424 using a virtual network interface 446. As described above, the virtual network interface 446 enables the software functions to communicate with computing resources connected to the virtual network 424 utilizing at least in part a network interface 456. The management agent 414 creates a network namespace 442 to place the network interface 456 and the virtual network interface 446. Furthermore, the network interface 456 may provide a mechanism for the virtual network interface 446 to send and receive data over the virtual network 424.

The software functions similar to software functions discussed elsewhere in the present disclosure may be running in virtualization instance environments (also referred to as tasks) of varying lifespans (e.g., short-term batch jobs, long-term background processes, etc.) that have been isolated from other processes within the compute instance. The management agent 414 acts as a go-between between the software functions and resources, services, virtual network interface 446, network interface 456, and other entities outside the namespace of the software functions. For example, the management agent 414 may create, provision, manage, and perform other operations to enable the software functions to communicate over the virtual network 424. In some implementations, the software functions may be configured to share external resources (e.g., virtual network interface 446 or network interface 456), such as block-level data storage volumes, memory, processors, antennas, and other computing resources of host computer systems. In some of these implementations, access to and communication with the shared external resources by the software functions may be made through the management agent 414. In other implementations, the compute instance or operating system 406 of the compute instance may support allowing the software functions to access or communicate with the shared resources without going through the management agent 414.

A management agent 414 may receive information associated with the virtual network 424 (e.g., networking information such as DNS information or subnet information) and the network interface 456. In addition, the management agent 414 may apply a set of rules to determine within which compute instance the software functions should be launched based at least in part on the network interface 456 associable to the software functions. For example, when the compute instance is instantiated, its management agent 414 may notify the management agent 414 that the compute instance is available for hosting software functions for a customer. In various embodiments, the management agent 414 forwards or otherwise provides the compute instance with the MAC address of the network interface 456 and places the network interface 456 in the global namespace 402.

As noted above, the global namespace 402 may be a namespace accessible to the software functions and/or compute instance. The management agent 414 may provide lifecycle and health information about the software functions being monitored by the management agent 414 to the container service. Furthermore, the management agent 414 may be a software function that is launched when the compute instance is created, and in other cases the management agent 414 may be a process running under the operating system 406 of the compute instance in communication with the software functions.

As illustrated in FIG. 4, a particular host may support the execution of multiple compute instances. These compute instances may each execute one or more software functions which may share the virtual network interface 446 (within the particular compute instance) to communicate with the virtual network 424. Each software function may be associated with a software function network namespace, such as software function network namespace one 440 and software function network namespace two 450. Each software function network namespace may be associated with a single software function and may provide the software function with access to the virtual network interface 446. As described in the present disclosure, the virtual network interface 446 may create a pipe or other communications channel between the software function network namespace and the network interface namespace. In this manner any number of software functions executed by a particular compute instance may share the network interface 456.

Returning to FIG. 4, the compute instance may access the physical hardware of a host computer system through virtual hardware interfaces, such as the network interface 456 and virtual network device 446, provided by the operating system 406 and managed by the management agent 414. The virtual hardware interfaces may include virtual device drivers or other interfaces configured to enable the compute instance to access physical hardware. The physical hardware may include processors, memory, networking devices, or other computing resources described in greater detail below. The management agent 424 may transmit requests, by the software functions, to the virtual hardware interfaces to utilize physical hardware. The virtual hardware interfaces may then translate and/or provide the request to the physical hardware for processing.

Figure 5:
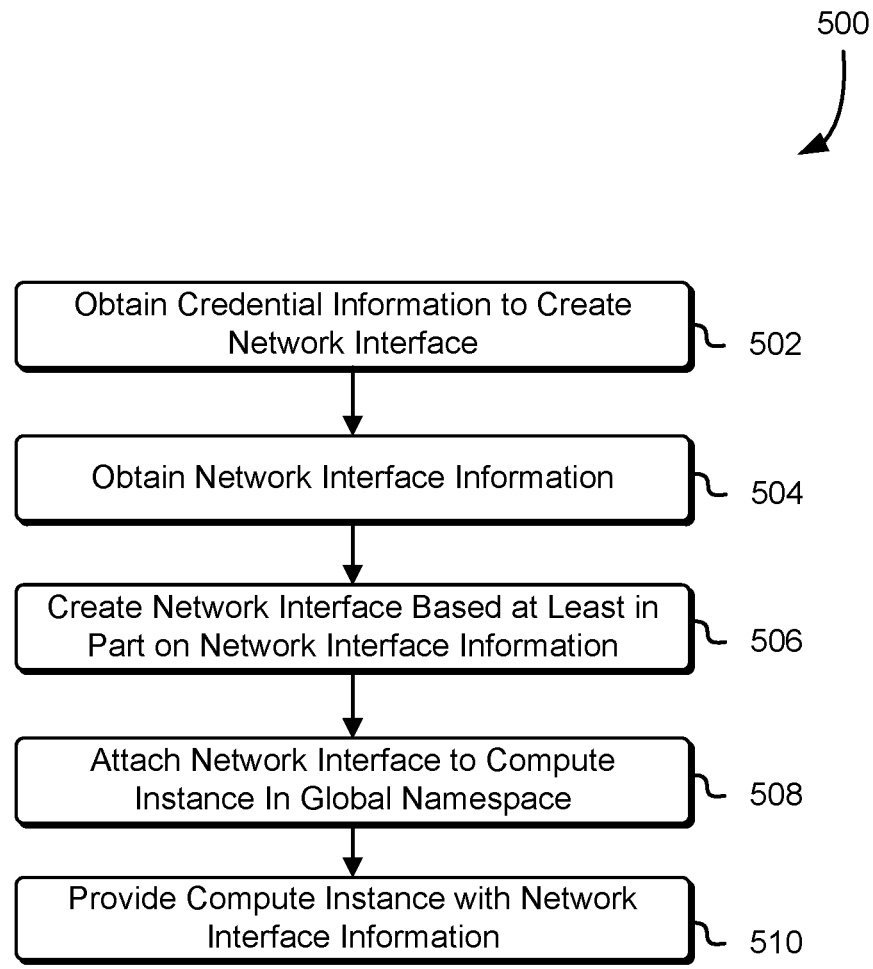
FIG. 5 is a block diagram that illustrates an example of provisioning a container instance with a network interface to enable a software function to communicate with computing resources connected to a virtual network in accordance with an embodiment.

FIG. 5 is a block diagram illustrating an example of a process 500 for providing software functions executing within compute instances access to a virtual network in accordance with an embodiment. The process 500 may be performed by any suitable system such as a container manager or management agent as described above in connection with FIGS. 2 and 4. Some or all of the process 500 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 500 includes obtaining credential information to create a network interface and/or virtual network interface 502. The credential information may include credentials of a customer of a computing resource service provider. For example, the customer may be attempting to have a particular software function executed by computing resources of the computing resource service provider, as such the computing resource service provider may obtain credential information from the customer. Furthermore, the particular software function may require access to other computing resources operated by the customer and connected to the customer's virtual network. The credential information may be required to create a network interface with the appropriate configuration to be able to communicate with the customer's virtual network. For example, the credential information may be used to generate a network interface using a virtual networking service. In addition, the customer may provide credential and other information suitable for obtaining the credentials in an API call, through a management console, or other suitable mechanism of transmitting such information.

The container manager or other system executing the process 500 may then obtain the network interface 504. The network interface information may include any networking information suitable for enabling the software function to communicate with other computing resources connected to the virtual network. The network interface information may include IP address information, subnet information, DNS information, routing information, security information, firewall information, MAC address, or other identifying information of the network interface, or other information about network interface and/or the virtual network. The container manager or other system executing the process 500 may then create the network interface based at least in part on the network interface information 506. For example, the network interface may be created with an IP address of the virtual network and a MAC address.

The container manager or other system executing the process 500 may then attach the network interface to the container instance's global namespace 508. As described above, the global namespace may be accessible to all of the software functions executing in the compute instance. In this manner a virtual network interface in a network namespace as described above can communicate with the network interface in the global namespace. For example, a particular software function transmits, from a virtual network interface in a software function network interface, packets to the virtual network interface in the network namespace which in turn provides the packets to the network interface in the network namespace with provides the packets to the network interface in the global namespace for transmission to the virtual network.

The container manager or other system executing the process 500 may then provide the compute instance with network interface information 510. For example, a container management agent executed within the compute instance may receive, from the container manager, a MAC address or other identifying information associated with the network interface attached to the global namespace. The information may be provided in an API call or other suitable mechanism. In addition, the information may enable the container management agent to detect and provision the network interface for use by one or more software functions executing within the compute instance.

Figure 6:
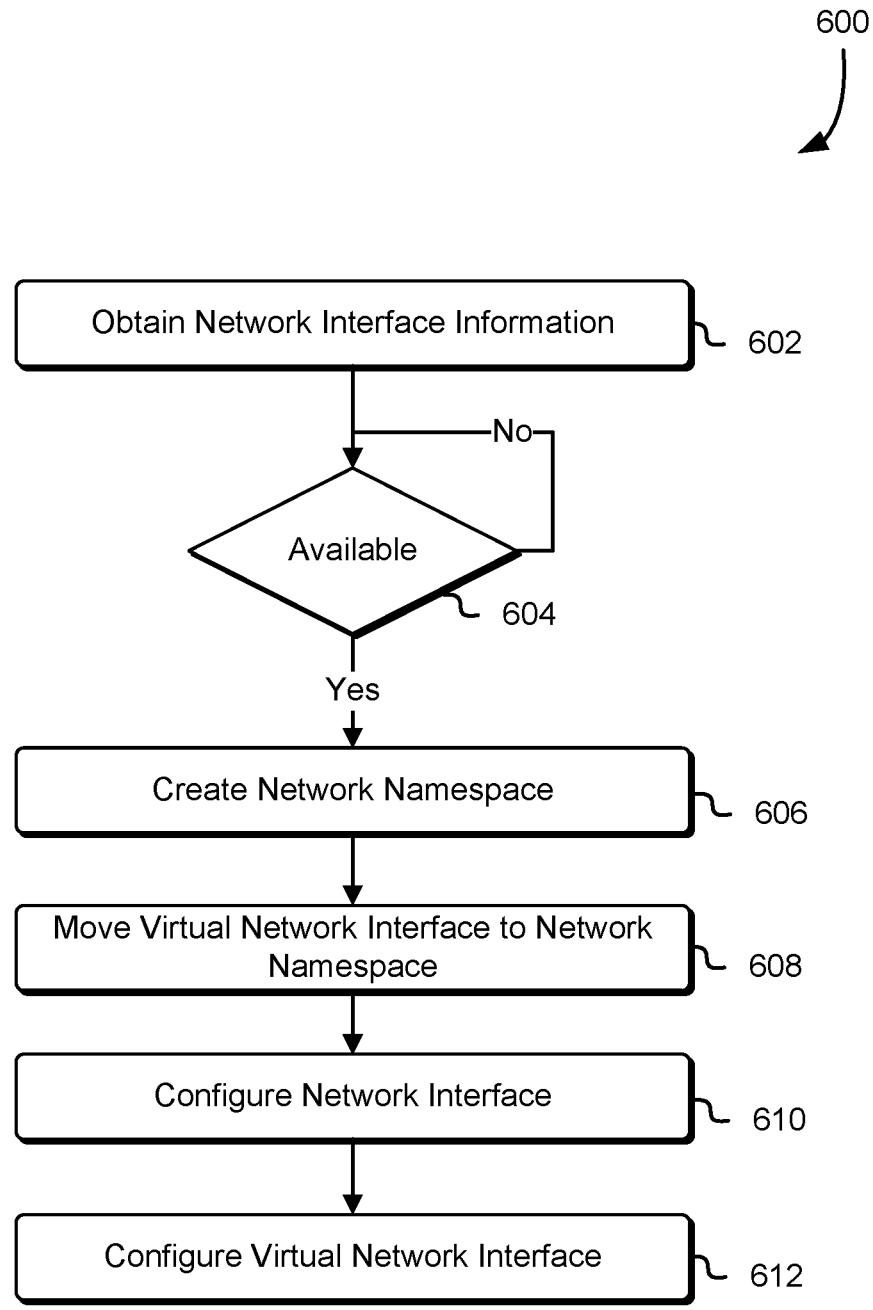
FIG. 6 is a block diagram that illustrates an example of provisioning a container instance with a virtual network interface to enable a software function to communicate with computing resources connected to a virtual network in accordance with an embodiment.

FIG. 6 is a block diagram illustrating an example of a process 600 for providing a software function with access to a virtual network in accordance with an embodiment. The process 600 may be performed by any suitable system such as a management agent described above in connection with FIG. 4. Some or all of the process 600 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 600 includes obtaining network interface information 602. The network interface information may include information for identifying and detecting a network interface attached to the global namespace as described above in connection with FIG. 5. For example, a container manager may transmit the MAC address of the network interface to the management agent executing within the compute instance. The management agent may then determine if the network interface is available 604. If the network interface is not available to the compute instance, the management agent may wait for the network instance to become available. Various application, scripts, daemons, or other executable code may execute prior to the network interface becoming available. For example, a "hotplug" script may execute making the network interface available to the compute instance once it has been attached to the global namespace.

Once the network interface is available, the management agent may then create a network namespace 606. The network namespace may provide isolation and an execution environment to the network interface as described above. In addition, a software function network namespace may be created for execution of a software function. The software function network namespace may provide the executing software function with access to the network interface through a virtual network interface as described above. As discussed above, because the network interfaces are within separate namespaces they can have overlapping IP addresses or address ranges. The management agent may then move the network interface to the networking namespace 608. The management agent may have privileges to create namespaces and attach/move resources to namespaces. The management agent may then configure the network interface 610. Configuring the network interface may include executing a script or application that modifies the settings of the network interface such that the network interface is accessible in the network namespace. In other words, once the network interface is moved to the network namespace it may be configured such that other computing resources within the compute instance may communicate with the network interface.

The system performing the process 600 may then configure a virtual network interface 612. The virtual network interface may be created by a container agent or management agent as described above. In addition, the virtual network interface may operate as a pipe and enable information to travel between a first interface of the virtual network attached to a software function network namespace to a second interface of the virtual network attached to the network namespace. The network interface may be configured with routing information, DNS information, routing information, network interface information, virtual network interface information, or other information to enable the software functions to communicate over the virtual network. For example, the management agent may execute a script that contacts a Dynamic Host Configuration Protocol (DHCP) server and modifies the IP address and DNS configuration of the network interface. In another example, the virtual network interface in the software function network namespace may be configured with information to access the virtual network interface in the network namespace. The network interfaces may be shared across software functions and/or compute instances.

In numerous variations to the process 600, the process 600 may be used to provide a software function with access to a previous provisioned network interface. In such embodiments, the system executing the process 600 may, after creating a software function network namespace, connect to the previously provision network interface through a virtual network interface of the software function. As one example, the system executing the process 600, in step 608, moves the virtual network interface to a previously provisioned network interface. In this example, step 610 is not required because the network interface has been previously provisioned with the appropriate network information for the customer's virtual network.

Figure 7:
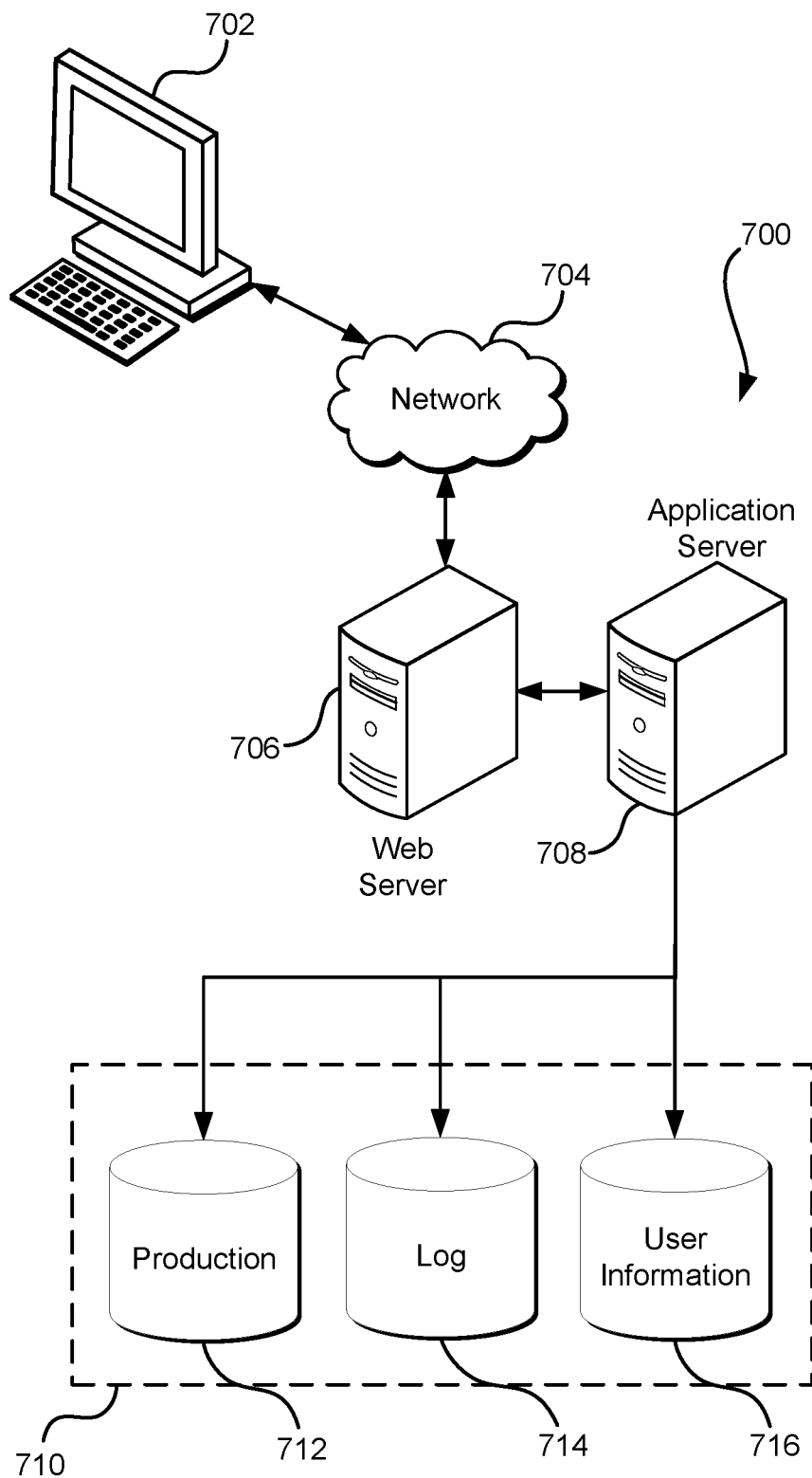
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes, and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. A computer-implemented method, comprising:
   detecting an instance of a software function that communicates with a set of computing resources connected to a virtual network of a computing resource service provider during execution of the software function;
   creating a network interface associated with a compute instance using credential information associated with an entity operating the virtual network;
   providing identification information of the network interface to the compute instance;
   creating a software function network namespace and a shared network namespace of the compute instance that are isolated from at least one other namespace of the compute instance;
   moving the network interface to the shared network namespace from a global namespace;
   instantiating a virtual network interface of the compute instance, a first portion of the virtual network interface attached to the software function network namespace and a second portion of the virtual network interface attached to the shared network namespace, thereby allowing transmission of data from the first portion of the virtual networking interface attached to the software function network namespace to the second portion of the virtual network interface attached to the shared network namespace;
   providing the compute instance access to the shared network namespace; and
   replacing, as a result of detecting an error associated with the compute instance, the compute instance with a replacement compute instance wherein the network interface and virtual network interface are associated with the replacement compute instance and the replacement compute instance hosts the software function.

2. The computer-implemented method of claim 1, further comprising modifying one or more settings of the network interface to include Domain Name System (DNS) information, subnet information, or security information associated with the virtual network.

3. The computer-implemented method of claim 1, wherein the virtual network is a private virtual network operated by the entity and implemented using computing resources of a computing resource service provider.

4. The computer-implemented method of claim 1, wherein launching the instance of the software function is performed on behalf of the entity in response to a request from a computing device operated by the entity.

5. A system, comprising:
   one or more processors; and
   memory with executable instructions that, as a result of execution by the one or more processors, cause the system to:
   receive information identifying a network interface;
   create a first network namespace for use by a compute instance to execute software functions and a second network namespace for containing the network interface;
   move the network interface to the second network namespace from a global namespace;
   instantiate, at the compute instance, a software function of a plurality of software functions, the plurality of software functions provided with access to the second network namespace;

create a virtual network interface attached to the first network namespace and the second network namespace, the virtual network interface associated with a virtual network;
provide the instantiated software function with access to the second network namespace through the virtual network interface; and
replace, as a result of detecting an error with the compute instance, the compute instance with a replacement compute instance wherein the network interface and virtual network interface are associated with the replacement compute instance and the replacement compute instance hosts the instantiated software function.

6. The system of claim 5, wherein the memory further includes executable instructions that, as a result of execution by the one or more processors, cause the system to provide the network interface with Domain Name System (DNS) information for contacting computing resources connected to the virtual network.

7. The system of claim 5, wherein the first network namespace provides isolation from at least one other process executed by the system and enables IP addresses to be shared among processes executed by the system.

8. The system of claim 5, wherein computing resources connected to the virtual network include at least one of: a compute instance, a database instance, or a storage instance.

9. The system of claim 5, wherein the memory further includes executable instructions that, as a result of execution by the one or more processors, cause the system to prevent a process from attaching the network interface to the global namespace in response to the process detecting information identifying the network interface.

10. The system of claim 5, wherein the memory further includes executable instructions that, as a result of execution by the one or more processors, cause the system to configure the network interface with networking information of the virtual network to enable the network interface to be used to communicate on the virtual network.

11. The system of claim 10, wherein the executable instructions that cause the system to configure the network interface further include instructions that, as a result of execution by the one or more processors, cause the system to query a Dynamic Host Configuration Protocol (DHCP) server to obtain the networking information.

12. The system of claim 10, wherein the networking information includes an Internet Protocol (IP) address, subnet mask, or gateway of the virtual network.

13. A non-transitory computer-readable storage medium having stored thereon executable instructions that, as a result of being executed by one or more processors of a computer system, cause the computer system to at least:
obtain identifying information for a network interface associated with a virtual network, the network interface attached to a global namespace;
create a network namespace on a compute instance and a software function network namespace on the compute instance, the network namespace isolated from the software function network namespace;
move the network interface from the global namespace to the network namespace;
attach a first interface of a virtual network interface to the network namespace and a second interface of the virtual network interface to the software function network namespace;
provide one or more software functions launched on the computer system with access to the network namespace; and
replace, as a result of detecting an error of the compute instance, the compute instance with a replacement compute instance wherein the network interface and virtual network interface are associated with the replacement compute instance and the replacement compute instance hosts the one or more software functions.

14. The non-transitory computer-readable storage medium of claim 13, wherein the instructions further comprise instructions that, as a result of being executed by the one or more processors, cause the computer system to obtain credentials for creating the network interface from an entity operating the virtual network.

15. The non-transitory computer-readable storage medium of claim 13, wherein the instructions further comprise instructions that, as a result of being executed by the one or more processors, cause the computer system to provide the network interface with routing information for at least one computing resource connected to the virtual network.

16. The non-transitory computer-readable storage medium of claim 13, wherein the instructions that cause the computer system to obtain identifying information for the network interface further include instructions that cause the computer system to obtain a media access control (MAC) address of the network interface.

17. The non-transitory computer-readable storage medium of claim 13, wherein the instructions further comprise instructions that, as a result of being executed by the one or more processors, cause the computer system to configure the network interface with an Internet Protocol (IP) address of the virtual network.

18. The non-transitory computer-readable storage medium of claim 13, wherein the instructions further comprise instructions that, as a result of being executed by the one or more processors, cause the computer system to:
obtain an image of a software function of the one or more software functions; and
provide the software function with access to the software function network namespace during execution of the software function.

19. The non-transitory computer-readable storage medium of claim 18, wherein the instructions that cause the computer system to provide the one or more software functions with access to the network namespace further include instructions that cause the computer system to provide the software function with access to the first interface of the virtual network interface within the network namespace through the second interface of the virtual network interface within the software function network namespace.

20. The non-transitory computer-readable storage medium of claim 19, wherein the instructions further comprise instructions that, as a result of being executed by the one or more processors, cause the computer system to:
obtain a second image of a second software function of the one or more software functions;
provide the second software function with access to a second software function network namespace during execution of the software function; and
provide the second software function with access to the network namespace.

* * * * *